(12) United States Patent  
Kwon et al.

(10) Patent No.: US 9,323,717 B2  
(45) Date of Patent: Apr. 26, 2016

(54) PROCESSOR AND SYSTEM FOR PROCESSING STREAM DATA AT HIGH SPEED

(75) Inventors: Kwon Taek Kwon, Seoul (KR); Seok Yoon Jung, Seoul (KR); Shi Hwa Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 837 days.

(21) Appl. No.: 13/599,465

(22) Filed: Aug. 30, 2012

(65) Prior Publication Data

US 2013/0073756 A1  Mar. 21, 2013

(30) Foreign Application Priority Data

Sep. 19, 2011  (KR) .................. 10-2011-0094030

(51) Int. Cl.
*G06F 9/38* (2006.01)
*G06F 15/80* (2006.01)
*G06F 3/06* (2006.01)

(52) U.S. Cl.
CPC .................... *G06F 15/8023* (2013.01)

(58) Field of Classification Search
None
See application file for complete search history.

(56) References Cited

U.S. PATENT DOCUMENTS

| | | | |
|---|---|---|---|
| 6,704,799 B1 | 3/2004 | Kindorf et al. | |
| 7,150,016 B2 | 12/2006 | Bauhofer et al. | |
| 7,167,949 B2 | 1/2007 | Yamagami et al. | |
| 2005/0283576 A1 | 12/2005 | Yamagami et al. | |
| 2008/0317015 A1* | 12/2008 | Beshai | 370/380 |

FOREIGN PATENT DOCUMENTS

| | | |
|---|---|---|
| JP | 5-210639 | 8/1993 |
| JP | 9-185549 | 7/1997 |
| JP | 11-134312 | 5/1999 |
| KR | 1998-0010786 | 4/1998 |
| KR | 1999-0030724 | 5/1999 |
| KR | 2001-0083446 | 9/2001 |
| KR | 2002-0059430 | 7/2002 |
| KR | 2003-0029103 | 4/2003 |
| KR | 2003-0061845 | 7/2003 |
| KR | 10-2004-0092394 | 11/2004 |
| KR | 10-2005-0057834 | 6/2005 |
| KR | 10-2009-0049079 | 5/2009 |
| KR | 10-2009-0119032 | 11/2009 |
| KR | 10-2010-0035394 | 4/2010 |
| KR | 10-2011-0033716 | 3/2011 |

* cited by examiner

*Primary Examiner* — Scott Sun

(74) *Attorney, Agent, or Firm* — NSIP Law

(57) ABSTRACT

A processor for processing stream data at a high speed is provided. The processor may include a functional unit to perform an operation on the stream data, an input interface module to perform relaying between the functional unit and an external data producer module that is used to input the stream data to the processor, and an output interface module to perform relaying between the functional unit and an external data consumer module that is used to receive an input of result data regarding a result of the operation performed by the functional unit.

13 Claims, 4 Drawing Sheets

PROCESSOR AND SYSTEM FOR PROCESSING STREAM DATA AT HIGH SPEED

CROSS-REFERENCE TO RELATED APPLICATIONS

This application claims the priority benefit of Korean Patent Application No. 10-2011-0094030, filed on Sep. 19, 2011, in the Korean Intellectual Property Office, the disclosure of which is incorporated herein by reference.

BACKGROUND

1. Field

Example embodiments of the following description relate to a processor, and more particularly, to a processor for processing stream data at a high speed.

2. Description of the Related Art

Batch-based processing is mainly used by processors to process a large amount of data, for example, a SRP. In batch-based processing, a same amount of input data and/or output data required for an operation, at a predetermined amount is collected in an L1 memory, and the collected data is processed.

First, a same amount of input data received from an external source, at a designated amount, may be collected in an input data buffer of the L1 memory, and output data may be collected in an output data buffer of the L1 memory, while performing an operation on the collected input data. Subsequently, the collected output data may be transmitted to the external source. The above operations may be performed simultaneously or sequentially. The above-described batch-based processing inevitably requires a high-cost L1 memory with a large input and/or output (I/O) bandwidth and a large storage capacity.

Hereinafter, conventional batch-based processing will be further described with reference to FIG. 1.

FIG. 1 illustrates a diagram of a structure of a conventional processor.

Referring to FIG. 1, the conventional processor may include a memory 110, and a functional unit 120. The functional unit 120 may perform an operation, and the memory 110 may store I/O data of the operation.

To achieve high performance in the conventional processor, a high-speed operation of the functional unit 120 may be required, and a high-speed memory 110 (for example, an L1 memory) may also be required. The functional unit 120 may directly access the memory 110 to store the I/O data in the memory 110. The memory 110 may include, for example, a cache memory or a scratch pad memory (SPM).

When a processor is used to process a large amount of data, for example, for the purpose of multimedia or scientific computation, the functional unit 120 needs to assimilate a required operation amount, and simultaneously needs to sufficiently provide a data bandwidth required by the memory 110.

In the conventional processor, each of an input buffer 111 and an output buffer 112 may use double buffering with buffers A and B to simultaneously perform an operation of the functional unit 120, an input data loading of an external data producer 101, and an output data fetching of an external data consumer 102.

The memory 110 of the conventional processor needs to simultaneously satisfy the following I/O bandwidth requirements:

1. Write input buffer write
2. Read input buffer
3. Randomly access to L1 memory
4. Write output buffer
5. Read output buffer As the conventional processor requires processing of a large amount of data with a higher performance, the I/O bandwidth requirements may be increased. However, since fully using a same capacity of a multi-port, wide-I/O memory at a considerable capacity causes high costs for an H/W area and a design burden, there is a need to sacrifice either performance or cost. In this case, the memory may enable a high-speed operation with a high I/O bandwidth to provide batch-based processing.

Additionally, when the functional unit 120 is operated using an H/W pipeline process or S/W pipeline process to consecutively process a serial of operations, when a maximum throughput is reached, it is efficient in performance to process a large amount of data (for example, a size of a batch) at a time, if possible. When data is processed several times, bubbles may occur in a pipeline, thereby reducing efficiency.

Since there is a need to use a large-capacity memory to set a large size of a batch to increase the efficiency, costs for an H/W area may be increased in proportion to the capacity of the memory.

Accordingly, there is a desire for a stream I/O interface architecture that may more efficiently process a large amount of data by overcoming a limitation of the conventional L1 memory-based batch-based processing.

SUMMARY

The foregoing and/or other aspects are achieved by providing a processor for processing stream data at a high speed, including a functional unit to perform an operation on the stream data, an input interface module to perform relaying between the functional unit and an external data producer module that is used to input the stream data to the processor, and an output interface module to perform relaying between the functional unit and an external data consumer module that is used to receive an input of result data regarding a result of the operation performed by the functional unit.

The input interface module may include an input multiplexer (MUX) to receive the stream data from the external data producer module, and to store the received stream data, and an input channel connected between the input MUX and the functional unit, to transfer the stream data from the input MUX to the functional unit.

The input MUX may include a plurality of input queues, and may store the stream data in the plurality of input queues for each data field.

The input channel may receive an input request signal for a single data field from the functional unit, and may transfer the input request signal to the input MUX. The input MUX may dequeue data from an input queue corresponding to the single data field, and may transfer the dequeued data to the input channel. The input channel may transfer the dequeued data to the functional unit.

The input request signal may include a field number of the single data field.

The output interface module may include an output MUX to receive the result data from the functional unit, and to store the received result data, and an output channel connected between the output MUX and the functional unit, to transfer the result data from the functional unit to the output MUX.

The output MUX may include a plurality of output queues, and may store the result data in the plurality of output queues for each data field.

The output channel may receive an output request signal for the result data from the functional unit, and may transfer the output request signal to the output MUX. The output request signal may include a data value of the result data. The output MUX may enqueue the data value in an output queue corresponding to the output request signal.

The output MUX may receive the output request signal from the external data consumer module, may dequeue a plurality of pieces of data, respectively, from the plurality of output queues, and may transfer the plurality of pieces of dequeued data to the external data consumer module.

The output request signal may further include a field number of a data field of the result data.

The foregoing and/or other aspects are achieved by providing a system, including an external data producer module to output stream data to a processor; an input interface module, within the processor, to receive, store, and transfer the stream data; a functional unit, within the processor, to perform an operation on the stream data; an output interface module, within the processor, to receive, store, and transfer a result of the operation performed by the functional unit; and an external data consumer module to receive the result data.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
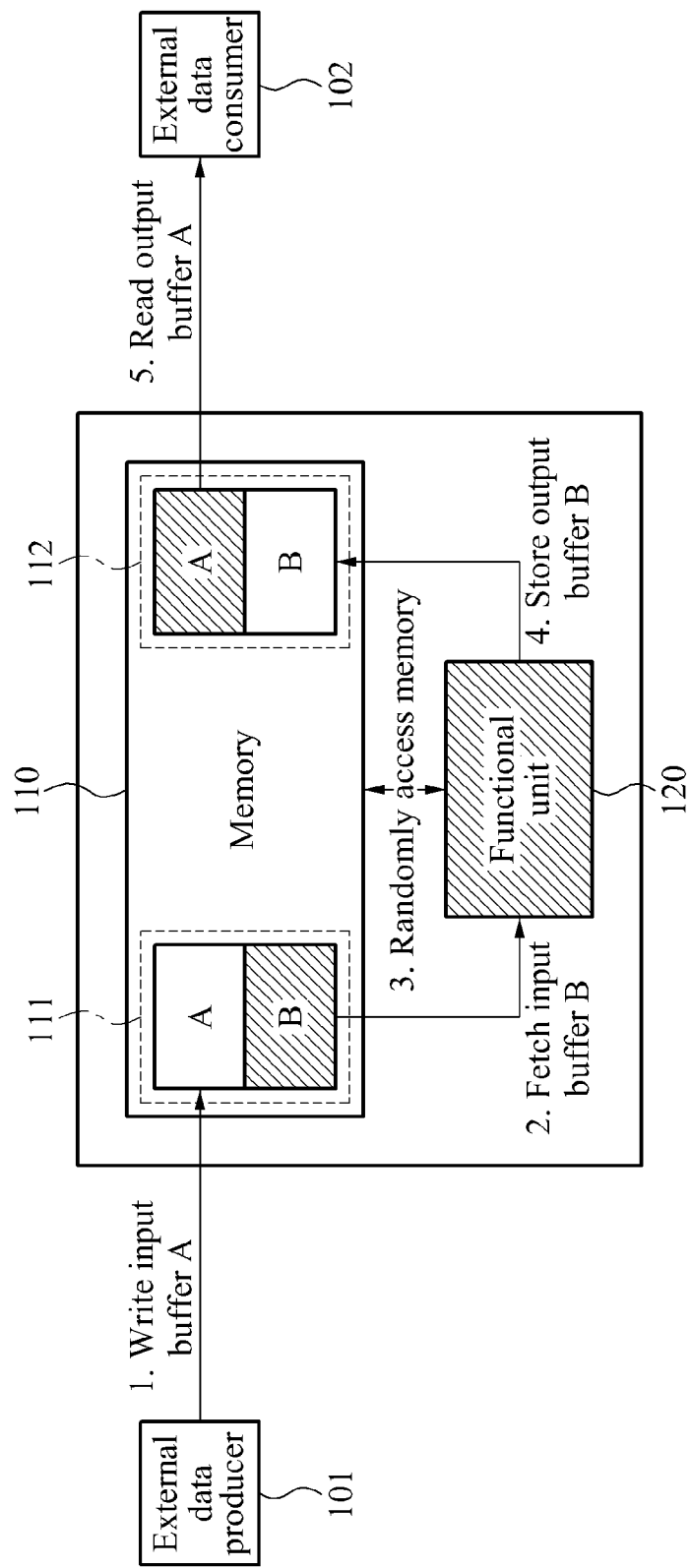
FIG. 1 illustrates a diagram of a structure of a conventional processor.

Reference will now be made in detail to example embodiments, examples of which are illustrated in the accompanying drawings, wherein like reference numerals refer to the like elements throughout. Example embodiments are described below to explain the present disclosure by referring to the figures.

Figure 2:
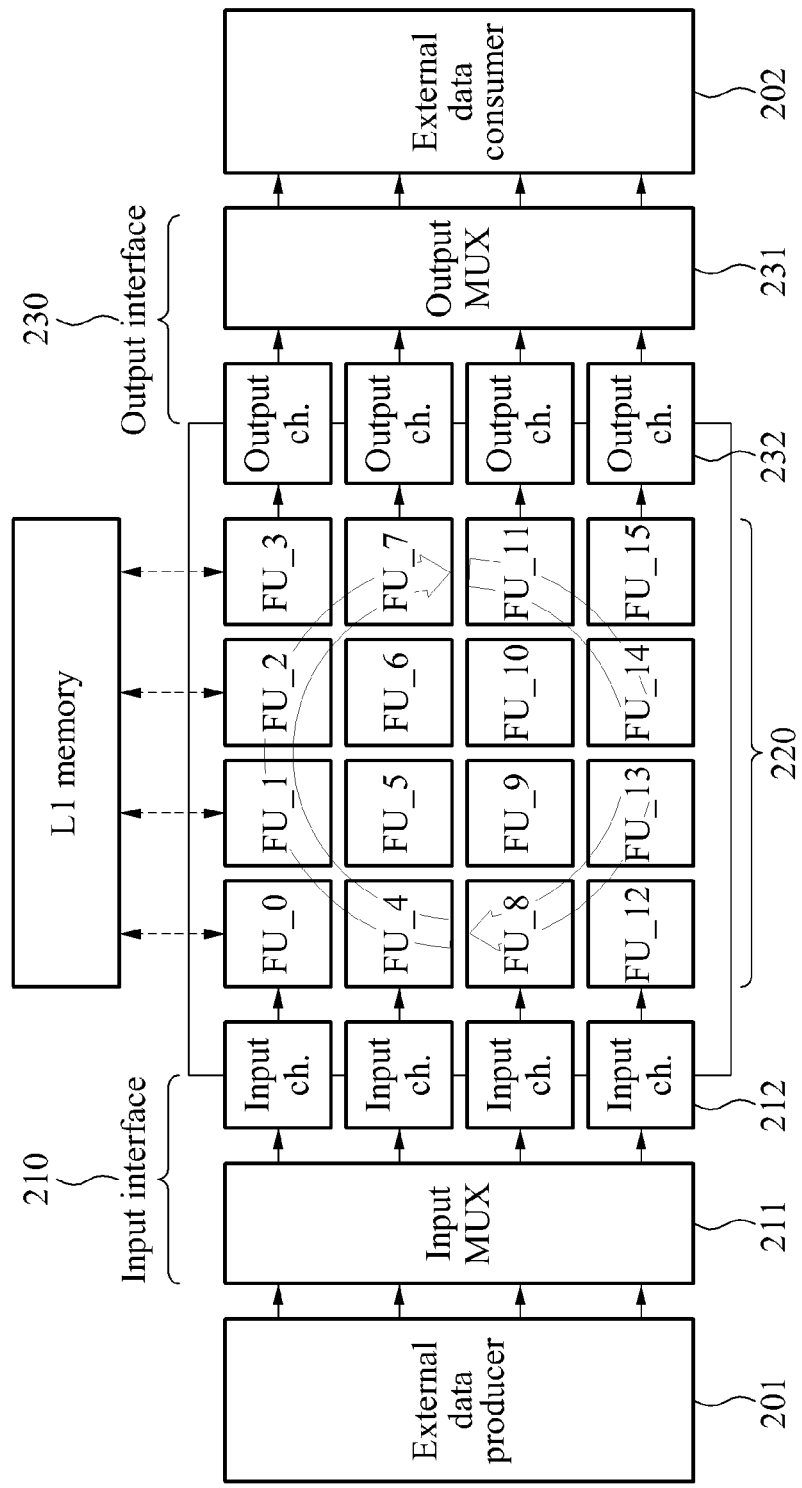
FIG. 2 illustrates a diagram of a structure of a processor, according to example embodiments.

FIG. 2 illustrates a diagram of a structure of a processor, according to example embodiments.

The processor of FIG. 2 may process stream data at a high speed, and may include an input interface module 210, a functional unit 220, and an output interface module 230.

The functional unit 220 may perform an operation on received data. In another embodiment, the processor of FIG. 2 may include a plurality of functional units 220.

The processor of FIG. 2 may receive stream data from an external data producer module 201. The input interface module 210 may perform relaying between the processor and the external data producer module 201. More specifically, the input interface module 210 may receive stream data from the external data producer module 201, may store the received stream data, and may transfer the stored stream data to the functional unit 220.

Hereinafter, a configuration of the input interface module 210 will be further described.

The input interface module 210 may include an input multiplexer (MUX) 211, and an input channel 212. The input MUX 211 may receive the stream data from the external data producer module 201. Additionally, the input MUX 211 may include a plurality of input queues, and may store the received stream data in the plurality of input queues for each data field.

The input channel 212 may be connected between the input MUX 211 and the functional unit 220, and may transfer the stream data from the input MUX 211 to the functional unit 220. Depending on example embodiments, a plurality of input channels 212 may be provided, and each of the input channels 212 may correspond to each of the functional units 220, or to a group of the functional units 220.

Since the input MUX 211 and the functional unit 220 are connected via the input channel 212, the input channel 212 may perform relaying between the input MUX 211 and the functional unit 220. For example, the functional unit 220 may require input data at regular intervals, and may transmit, to the input channel 212, an input request signal for a single data field. The input request signal may include a field number of the single data field. The input channel 212 may receive the input request signal from the functional unit 220.

Additionally, the input channel 212 may transfer the received input request signal to the input MUX 211. In response to the input request signal, the input MUX 211 may dequeue data from an input queue corresponding to the single data field associated with the input request signal, and may transfer the dequeued data to the input channel 212. Subsequently, the input channel 212 may transfer the dequeued data to the functional unit 220. In other words, the functional unit 220 may receive stream data from the input MUX 211 via the input channel 212, and may process the received stream data. An operation of the input channel 212, and an operation of the input MUX 211 will be further described with reference to FIG. 3.

Through the above-described operations, the functional unit 220 may perform an operation on the stream data, and may output result data, obtained by performing the operation, to the external data consumer module 202. The output interface module 230 may perform relaying between the external data consumer module 202 and the functional unit 220. Specifically, the output interface module 230 may receive the result data from the functional unit 220, may store the received result data, and may output the stored result data to the external data consumer module 202.

Hereinafter, a configuration of the output interface module 230 will be further described.

The output interface module 230 may include an output MUX 231, and output channels 232. The output MUX 231 may receive the result data from the functional unit 220. Additionally, the output MUX 231 may include a plurality of output queues, and may store the received result data in the plurality of output queues for each data field.

The output channel 232 may be connected between the output MUX 231 and the functional unit 220, and may transfer the result data from the functional unit 220 to the output MUX 231. Depending on example embodiments, a plurality of output channels 232 may be provided, and each of the output channels 232 may correspond to each of the functional units 220, or to a group of the functional units 220.

Since the output MUX 231 and the functional unit 220 are connected via the output channel 232, the output channel 232 may perform relaying between the output MUX 231 and the functional unit 220. For example, the functional unit 220 may transmit an output request signal for the result data to the output channel 232 at regular intervals. The output request signal may include a data value of the result data. Additionally, the output request signal may further include a field number of a data field of the result data. The output channel 232 may receive the output request signal from the functional unit 220.

Additionally, the output channel 232 may transfer the received output request signal to the output MUX 231. In response to the output request signal, the output MUX 231 may enqueue the data value of the result data in an output queue corresponding to the output request signal.

For example, when the result data is required, the external data consumer module 202 may transmit to the output MUX 231 a signal to request an output of the result data. In this example, the output MUX 231 may receive the signal from the external data consumer module 202. In response to the signal, the output MUX 231 may dequeue a plurality of pieces of data, respectively, from the plurality of output queues, and may transfer the plurality of pieces of dequeued data to the external data consumer module 202. An operation of the output channel 232, and an operation of the output MUX 231 will be further described with reference to FIG. 4.

Figure 3:
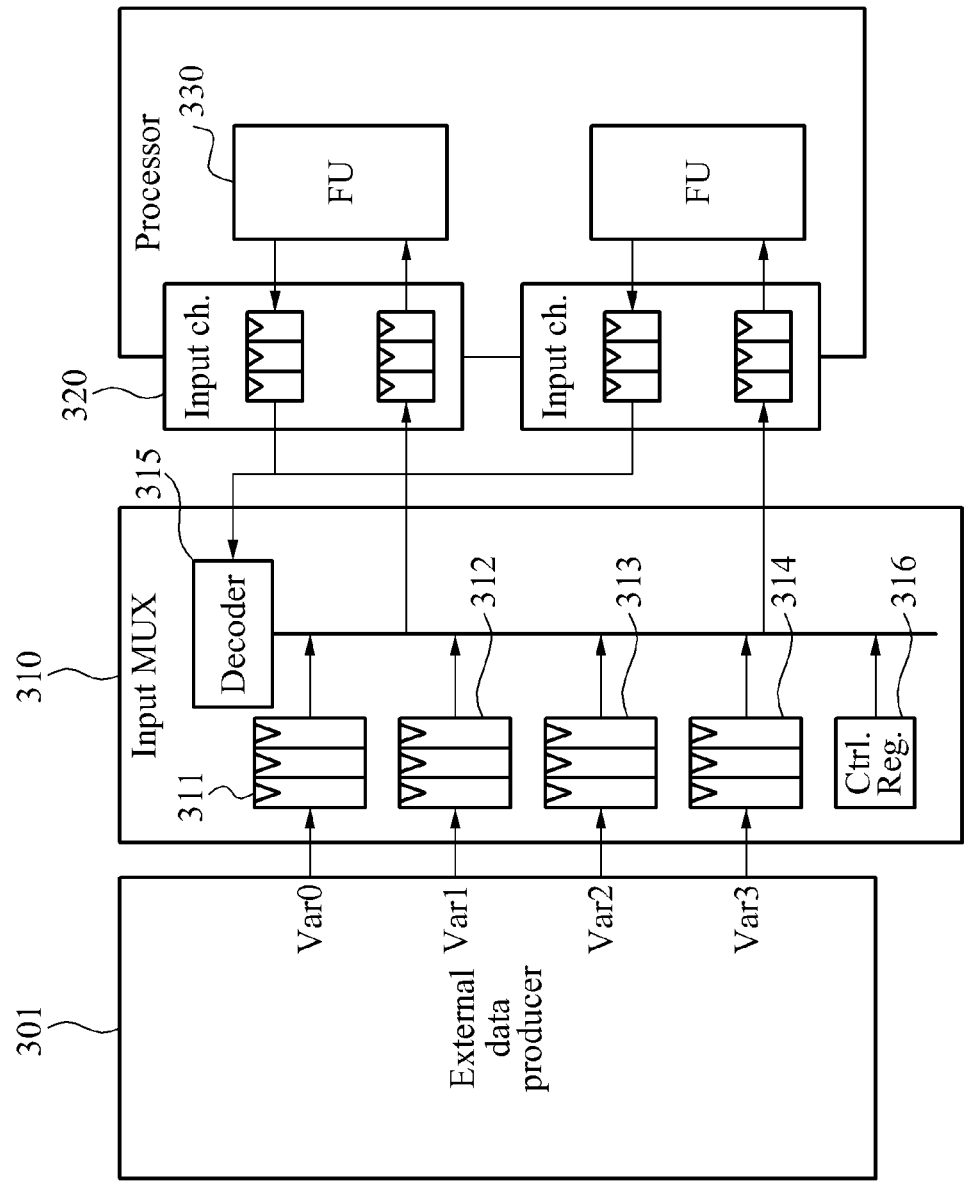
FIG. 3 illustrates a diagram of a structure of an input multiplexer (MUX), according to example embodiments.

FIG. 3 illustrates a diagram of a structure of an input MUX 310, according to example embodiments.

Referring to FIG. 3, the input MUX 310 may include a plurality of input queues 311, 312, 313, and 314.

When an external data producer module 301 is ready to output stream data, and when space exists in the input queues 311, 312, 313, and 314 in the input MUX 310, the external data producer module 301 may transmit the stream data to the input MUX 310. The input MUX 310 may store the stream data received from the external data producer module 301 in the input queues 311, 312, 313, and 314, for each data field. Depending on example embodiments, the input MUX 310 may include a decoder 315 to distribute the received stream data in the input queues 311, 312, 313, and 314, based on data field numbers, and to store the distributed stream data, based on a decoding logic. Additionally, the input MUX 310 may further include a control register file 316 to control an operation of a module.

A functional unit 330 may require input data at regular intervals, and may transmit to an input channel 320 an input request for a single data field. The input request signal may include a field number of the single data field that is required by the functional unit 330.

The input channel 320 may transmit the input request signal to the input MUX 310. The input MUX 310 may receive the input request signal, and may dequeue data from an input queue corresponding to the field number that is included in the received input request signal. Additionally, the input MUX 310 may transmit the dequeued data to the input channel 320. Subsequently, the input channel 320 may transfer the dequeued data to the functional unit 330, so that the functional unit 330 may receive the required input data.

Figure 4:
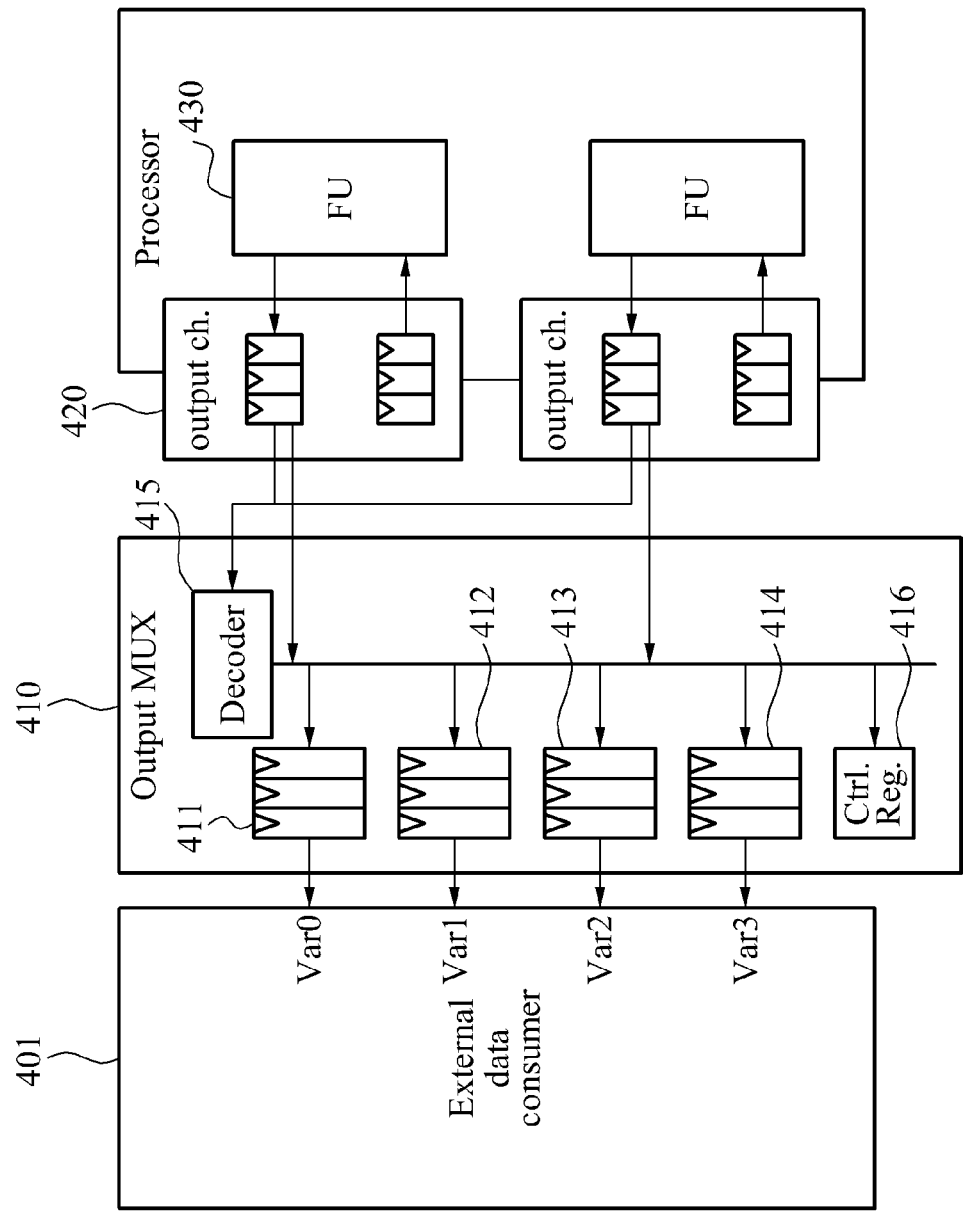
FIG. 4 illustrates a diagram of a structure of an output MUX, according to example embodiments.

FIG. 4 illustrates a diagram of a structure of an output MUX 410, according to example embodiments.

Referring to FIG. 4, the output MUX 410 may include a plurality of output queues 411, 412, 413, and 414. Specifically, the plurality of output queues 411, 412, 413, and 414 may be included in the output MUX 410 for each data field.

A functional unit 430 may transmit, to an output channel 420 at regular intervals, an output request signal for result data regarding a result of an operation performed by the functional unit 430. The output request signal may include a data value of the result data, and a data field number of the result data. The output channel 420 may transfer the output request signal to the output MUX 410, and the output MUX 410 may receive the output request signal. The output MUX 410 may store the result data in an output queue corresponding to the data field number included in the output request signal. Depending on example embodiments, the output MUX 410 may include a decoder 415 to distribute the received result data in the output queues 411, 412, 413, and 414, based on data field numbers. The decoder 415 may store the result data in an output queue, corresponding to the data field number, based on a decoding logic. Additionally, the output MUX 410 may further include a control register file 416 to control an operation of a module.

For example, when an external data consumer module 401 is ready to fetch the result data, and when the result data is stored in the output queues 411, 412, 413, and 414 included in the output MUX 410, the external data consumer module 401 may transmit to the output MUX 410 a signal to request an output of the stored result data. When the signal is received from the external data consumer module 401, the output MUX 410 may dequeue data from each of the output queues 411, 412, 413, and 414, and may transmit the dequeued data to the external data consumer module 401.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. The described hardware devices may be configured to act as one or more software modules in order to perform the operations of the above-described example embodiments, or vice versa.

Further, according to an aspect of the embodiments, any combinations of the described features, functions and/or operations can be provided.

Moreover, at least one processor may be included to execute at least one of the above-described units and methods.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A processor for processing stream data at a high speed, the processor comprising:
   a functional unit configured to perform an operation on the stream data;
   an input interface module comprising an input multiplexer (MUX) and an input channel, the input interface module configured to relay data between the functional unit and an external data producer module, and an output interface module configured to relay data between the functional unit and an external data consumer module, the external data consumer module configured to receive result data from the operation performed by the functional unit, wherein the input MUX is configured to receive the stream data from the external data producer module and the input channel, connecting the input MUX to the functional unit, is configured to transfer the stream data from the input MUX to the functional unit.

2. The processor of claim 1, wherein the input MUX is configured to store the received stream data.

3. The processor of claim 2, wherein the input MUX comprises a plurality of input queues, and wherein the input MUX is configured to store the stream data in the plurality of input queues for each data field.

4. The processor of claim 3, wherein the input channel receives an input request signal for a single data field from the functional unit, and transfers the input request signal to the input MUX, wherein the input MUX dequeues data from an input queue corresponding to the single data field, and transfers the dequeued data to the input channel, and wherein the input channel transfers the dequeued data to the functional unit.

5. The processor of claim 4, wherein the input request signal comprises a field number of the single data field.

6. The processor of claim 1, wherein the output interface module comprises:

an output MUX configured to receive the result data from the functional unit, and to store the received result data; and an output channel connected between the output MUX and the functional unit, configured to transfer the result data from the functional unit to the output MUX.

7. The processor of claim 6, wherein the output MUX comprises a plurality of output queues, and wherein the output MUX stores the result data in the plurality of output queues for each data field.

8. The processor of claim 7, wherein the output channel receives an output request signal for the result data from the functional unit, and transfers the output request signal to the output MUX, wherein the output request signal comprises a data value of the result data, and wherein the output MUX enqueues the data value in an output queue corresponding to the output request signal.

9. The processor of claim 8, wherein the output MUX receives the output request signal from the external data consumer module, dequeues a plurality of pieces of data, respectively, from the plurality of output queues, and transfers the plurality of pieces of dequeued data to the external data consumer module.

10. The processor of claim 8, wherein the output request signal further comprises a field number of a data field of the result data.

11. The processor of claim 1, wherein the functional unit includes a plurality of functional units.

12. The processor of claim 2, wherein the input channel includes a plurality of input channels.

13. A system for processing stream data at a high speed, the system comprising:

an external data producer module configured to output stream data to a processor;

an input interface module, within the processor comprising an input multiplexer (MUX) and an input channel, the input interface module configured to receive, store, and transfer the stream data;

a functional unit, within the processor, configured to perform an operation on the stream data;

an output interface module, within the processor, configured to receive, store, and transfer result data comprising a result of the operation performed by the functional unit; and an external data consumer module configured to receive the result data, wherein the input MUX is configured to receive the stream data from the external data producer module and the input channel, connecting the input MUX to the functional unit, is configured to transfer the stream data from the input MUX to the functional unit.

* * * * *